June 3, 1958   W. D. HERSHBERGER   2,837,649
STABILIZER FOR MICROWAVE OSCILLATORS
Filed Aug. 1, 1955
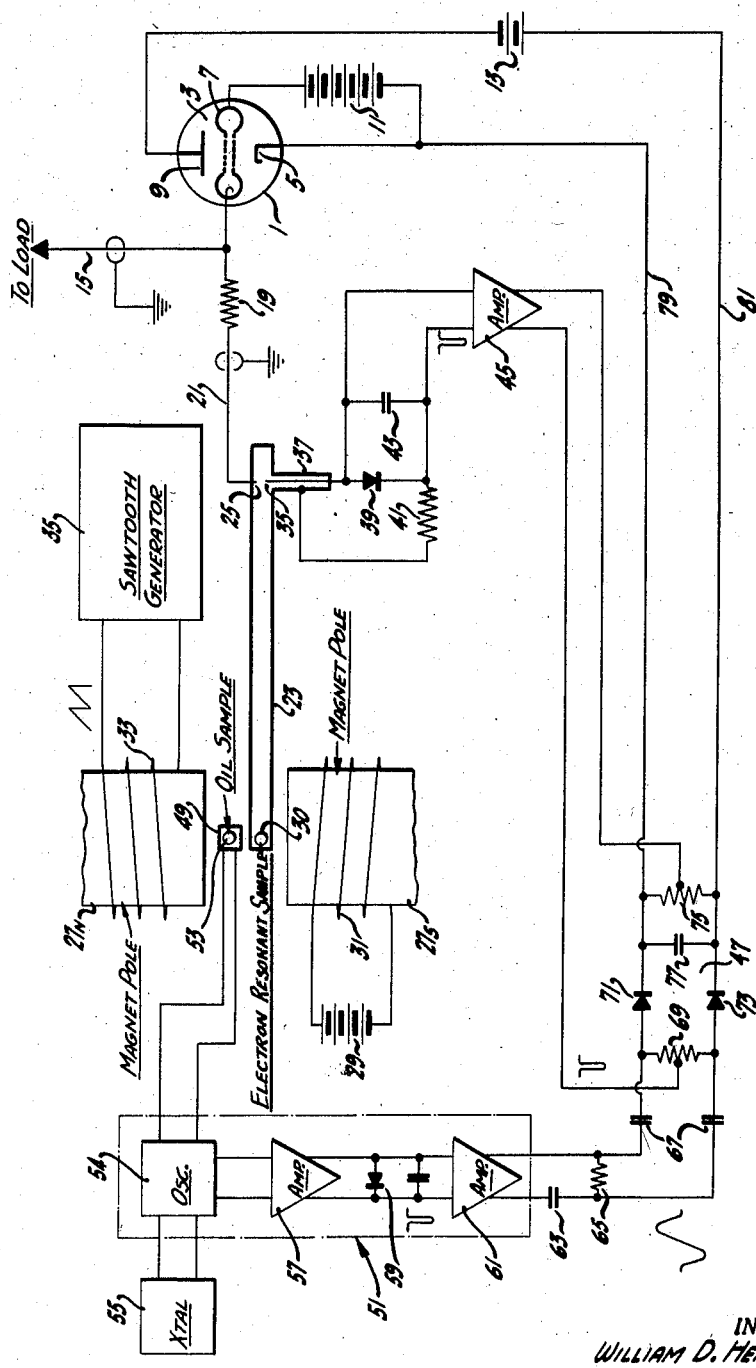
INVENTOR.
WILLIAM D. HERSHBERGER
BY
Lippincott + Smith
ATTORNEYS

United States Patent Office 2,837,649
Patented June 3, 1958

2,837,649
STABILIZER FOR MICROWAVE OSCILLATORS

William D. Hershberger, Los Angeles, Calif., assignor to The Regents of the University of California, Berkeley, Calif., a corporation of California Application August 1, 1955, Serial No. 525,625

5 Claims. (Cl. 250—36)

This invention relates to stabilizing the frequencies of oscillation generators operating in the microwave region, where direct stabilization by means of such well known controls as piezoelectric crystals is impractical and where the amount of frequency multiplication (or division) required to use such crystals indirectly is so great as to make these expedients also impractical if conventional methods are employed.

Among the objects of the present invention are to provide means and methods for stabilizing microwave oscillators with substantially the same percentage accuracy as can be accomplished in lower frequency ranges by the direct use of piezoelectric crystals; to provide means and methods for effectively multiplying the frequency upon which a conventional crystal will stabilize an oscillator by factors of over two orders of magnitude at a single step; to provide means for stabilizing frequencies of such oscillators as klystrons and traveling wave tubes, which are sensitive to variations in supply voltages, bias voltages, or both; to provide means for multiplying the frequency at which a given piezoelectric crystal or like device can effect a control of an oscillator by a factor which is fixed and absolute; and to provide apparatus for the above purposes which is relatively simple, rugged, and easy to maintain.

It is now well known that paramagnetic substances, when subjected to a magnetic field, will resonate to and absorb electromagnetic waves over a narrow band of frequencies or "line," the center frequency whereof is directly proportional to the strength of the magnetic field to which they are subjected. Under other circumstances, if the same substances are subjected to a sudden change in the direction of the magnetic field, they will radiate electromagnetic waves of the same frequencies which they absorb under the conditions first mentioned. These effects are attributable to spins of the fundamental particles of which the atoms or molecules entering into the substances are composed. The paramagnetic substances are those wherein such spins are not counterbalanced by equal and opposite spins in other particles entering into the substance. When subjected to a magnetic field these paramagnetic materials develop a magnetic moment in the direction of the field and due to their spins there is associated with the magnetic moment an angular momentum which results in a precession around their new equilibrium position when the direction of the field is changed and the resulting radiation of electromagnetic waves at the frequency of the precession; conversely, electromagnetic waves are absorbed by the particles in inducing a like precession when the substances are in a polarizing field.

Both of these phenomena have been used in fluxmeters or magnetometers which are commercially available. The Pound magnetometer described in the Review of Scientific Instruments, 21, 219–225 (1950) uses the absorption phenomenon. A feebly oscillating oscillator is connected to a probe containing a coil at right angles to the magnetic field, the coil surrounding a sample of the paramagnetic material used. The field in which the probe is mounted is varied through a narrow range on each side of the main field to be measured, and as the field is swept through the value at which the sample exhibits a line of gyromagnetic resonance the amplitude of the oscillation is decreased because of the absorption load imposed upon the oscillator. The result is a pulse of downward modulation in the amplifier output, which can be amplified and detected. In the Varian-Bloch fluxmeter, (U. S. Patents Nos. 2,561,489 and 2,561,490) the reverse phenomenon is employed and a pulse of oscillations is generated as the field is passed through the resonant value. The "linewidth" of the resulting modulations, upward instead of downward in the case of the Bloch device, is defined as the width of the frequency band between the half-power points. The shape of the pulse in either case is substantially that of the familiar resonance curve. As the emission and absorption lines are identical in frequencies it will be convenient to refer to them herein as the "absorption lines" of the materials used.

A given material may exhibit a number of absorption lines, depending on the nature of the particle exhibiting the spin. Certain materials having a large concentration of free electrons, such as tris-p-nitro-phenyl-methyl or diphenyl-picryl-hydrazyl; in such materials the absorption line is very nearly that of the free electron. In this case the center frequency of the resonant line is defined by the equation:

$$f_e = \frac{g_e\left(\frac{e}{m}\right)H}{4\pi c} \qquad \text{Equation 1}$$

where $g_e$ is the gyromagnetic constant of the particular material, $e/m$ is the ratio of charge to mass of the electron and $c$ is the speed of light. For the hydrazyl compound mentioned above, $g_e = 2.0036$. Equation 1 may be simplified by combining the constants to read:

$$f_e = \frac{H}{k} \qquad \text{Equation 2}$$

$k$ being defined as the gyromagnetic ratio of the electrons in the material used.

In other materials (ore even in the same material) an absorption line may be due to unbalanced spins within the nuclei of the atoms. In this case the center frequency of the absorption line is given by the equation:

$$f_n = \frac{g_n\left(\frac{e}{M}\right)H}{4\pi c} = \frac{H}{K} \qquad \text{Equation 3}$$

where $g_n$ is the gyromagnetic constant of the nucleus, $e/M$ is the ratio of charge to mass of the nucleus and $K$ is the nuclear gyromagnetic ratio. Water exhibits a strong absorption line due to the protons forming the nuclei of the hydrogen atoms in the compound, at frequencies defined by $f_p$, determined by substituting $g_p$, the gyromagnetic constant of the proton in Equation 3 above.

It will be seen from the form of the equations given that the frequencies $f_e$ and $f_n$ bear a constant ratio, each varying linearly with the value of the field H.

In the case of the electron absorption line of hydrazyl and the proton line of mineral oil this ratio is:

$$\frac{f_e}{f_p} = 658.658 \qquad \text{Equation 4}$$

In accordance with the broad concept of the present invention this constant ratio of line frequency between an electronic absorption line and a nuclear absorption line is utilized to give a multiplication factor whereby a microwave frequency can be compared with and stabilized against a much lower frequency standard, such as a piezoelectric crystal. Two samples of paramagnetic materials are used, that have, respectively, an electronic absorption line and a nuclear absorption line of known gyromagnetic ratios. Both are subjected to the same magnetic field, which is varied through a small range extending on both sides of a value which will give to the sample exhibiting electron absorption at the frequency on which it is desired that the microwave generator be stabilized. The sample having the electron absorption line is coupled in a resonator which, in turn, is loosely coupled to the generator. The sample having the nuclear absorption line is mounted within the probe of a gyromagnetic-type fluxmeter, which is tuned, preferably by means of a piezo-electric crystal, to a frequency which bears to the desired oscillator frequency the ratio $f_e/f_n$. As the varying magnetic field passes through the value of H which will impart to the sample in the resonator a resonant frequency equal to that being developed by the generator to be stabilized, there is produced a pulse of downward modulation within a resonator. The latter is coupled to a detector which converts the modulation into a unidirectional pulse. This is amplified and supplied to a phase discriminator (phase-sensitive or coincidence detector). As the magnetic field passes through the frequency to which the fluxmeter is tuned, the latter also develops a pulse of modulation which is similarly detected and amplified and fed to the phase discriminator for comparison with the pulse from the resonator. If the generator to be controlled is operating at precisely the desired frequency the two pulses will occur at the same instant and there will be no output from the phase discriminator. If, however, the generator is a little off frequency, the pulses will not be simultaneous. Assuming the magnetic field is decreasing and the frequency of the generator is too high, the pulse delivered by the sample having the electron absorption line will occur before that from the fluxmeter and the discriminator will develop a voltage of one sign, whereas if the frequency of the generator is too low this pulse will come later in the cycle than that of the fluxmeter and the voltage developed by the discriminator will be of the opposite sign. The voltage pulses from the discriminator are integrated and are applied back to the generator in such phase as to correct its deviation from the desired value.

The accompanying drawing is a diagram, partly in block and partly in schematic form, of a preferred embodiment of the invention as used to stabilize the frequency of an oscillator of the klystron type. From this diagram, together with a detailed description of the apparatus illustrated which follows, the application of the invention to other types of generators, operating at the same or other frequencies, should be evident.

In the diagram, the generator to be stabilized is indicated as a klystron 1. This is shown in highly symbolic and simplified form as comprising an envelope 3 containing a cathode 5, a cavity resonator 7, and a reflector 9, the other elements being omitted to simplify the drawing. The resonator is shown as being maintained at a potential positive to the cathode by means of a battery or other source 11. The reflector is indicated as maintained slightly negative to the cathode by a battery 13. The frequency of the oscillator can be varied by changing the potential of the reflector electrode, which alters the transit time of the electrons passing through the cavity and returning. Since klystrons are well understood and the klystron circuit itself is no part of the invention other details of the arrangement are not shown.

The output of the oscillator is indicated as taken off through a coaxial cable 15 that is coupled to the resonant cavity, and that feeds a load, not shown.

For purposes of illustration it is assumed that the desired frequency of the oscillator lies within the 3 cm. "X-band" in the neighborhood of 10,000 mc.; specifically, the assumed frequency of the oscillator is 9400 mc.

A branch line, taken off from the line 15, feeds, through a resistor 19 and coaxial cable 21, into a cavity resonator 23. This resonator may, for example, be a section of waveguide, closed at both ends, and tuned to the 9400 mc. frequency. The line 21 couples into the resonator by means of an antenna 25. The resonator extends between pole pieces $27_n$ and $27_s$ of a magnet, the body of which is omitted from the drawing for simplicity. Within the end of the resonant cavity and centered in the field of the magnet is a sample 30 of paramagnetic substance having a well defined electron absorption line, assumed, in this case, to be the hydrazyl compound, the gyromagnetic constant of which was given above, i. e., 2.0036.

Substituting the generator frequency 9400 for $f_e$ in Equation 1, we find for H the value 3350.1 gauss, and the mean field between the magnet poles $27_n$ and $27_s$ is adjusted to approximately this value. An exact adjustment is desirable but not necessary; an approximate adjustment will do.

It is assumed for purposes of illustration that an electromagnet is used to develop the polarizing field and that the constant field is established by means of a source 29 supplying a winding 31. In addition a second winding 33 is supplied by a sawtooth generator 35 which varies the resultant field between the pole pieces above and below its mean value through a range of perhaps 25 gauss. As the field varies through this range it will pass through a point where the frequency $f_e$ is equal to the frequency instantaneously supplied by the generator 1. As it does so, the sample absorbs the energy within the resonator 23, instantaneously decreasing the intensity of the fields within it and producing a pulse of downward modulation. A second antenna 35 connects through a coaxial line 37 to a detector circuit comprising a crystal rectifier 39 in series with a resistor 41 and bridged by a small condenser 43. This converts the pulse of modulation to a unidirectional pulse which is fed into an amplifier 45.

The amplified pulses are supplied to a discriminator generally identified by the reference character 47, as will be later described.

The probe 49 of a fluxmeter 51 is also inserted in the gap between the pole pieces of the magnet so that a sample 53 of paramagnetic material within the probe is subjected to the same varying field as the sample 30. In the equipment shown fluxmeter 51 is assumed to be of the Pound type. It is slightly modified from the commercial form, however, in that the Helmholtz coils normally used in meters of this type to supply the superposed variation on the field to be measured are omitted or disconnected, the variations being supplied by the coils 33 in the sawtooth generator circuit. Further, the oscillator, normally included in fluxmeters of this type, is stabilized by a crystal 55. The sample 53 used in the instrument here described is water and the absorption line used is the proton absorption line. As has been shown above, the frequency ratio $f_e/f_p$ of the electron absorption line of the sample 30 to the protron absorption line of the sample 53 is 658.658 and accordingly crystal 55 is ground to the operating frequency of the generator 1 divided by this ratio i. e., $$\frac{9400}{658.658} = 14.271 \text{ mc.}$$

The absorption in the sample 53 modulates this frequency downward as the field strength H of the magnet passes through the appropriate value to give an absorption line at this frequency. The output of the oscillator 54 is amplified in amplifier 57, detected in the conventional detector circuit 59, to produce a unidirectional pulse, and then reamplified in amplifier 61 at low frequency.

From amplifier 61 the pulse passes to a differentiating network indicated as a series condenser 63 and shunt resistor 65 that convert it into the familiar bidirectional pulse resulting from such differentiation, this latter pulse crossing the zero voltage point at the instant of the maximum of the unidirectional pulse from which it is derived. From this point it passes to phase discriminator 47. It should be noted that it makes no real difference whether the differentiating network is connected in the output of the fluxmeter or the amplifier 45, either will give the same result as long as the output of the phase discriminator is properly poled.

The differentiating network connects to the phase discriminator through a pair of condensers 67. The discriminator comprises a center-tapped shunt resistor 69 followed by a pair of diode rectifiers, 71 and 73 which may be either the tube or contact type, similarly poled, one in each lead. A second center-tapped shunt resistor 75 connects across the rectifier outputs, and is shunted by a condenser 77. Leads from the amplifier 45 connect to the center taps of resistors 69 and 73, the connections being poled so that the rectifiers pass the unidirectional pulses from the amplifier. A lead 79 connects from one side of the resistor 75 to the cathode 5 of the klystron, and a second lead 81 connects, through the biasing battery 13, from the other end of resistor 75 to the reflector electrode 9 of the klystron, so that the voltage developed across the phase discriminator adds or subtracts from the reflector bias, depending upon whether the pulse from the generator leads or lags that from the fluxmeter.

The connections are such that if the generator pulse leads, and the sawtooth wave from the generator is such that the magnetic field increases during the long slope of the cycle (indicating that the frequency of the generator is too low), the negative bias on the connector 9 is increased. The electrons of the beam are thus reflected sooner and their transit time is decreased, thereby increasing the frequency of the generator. If the generator pulse lags the reverse is the case.

The constancy which the frequency of the generator can be maintained depends on the gain of the servo-loop; i. e., upon the gain of amplifiers 45, 57 and 61 and the sensitivity of the generator to changes in the potential of the reflector 9. The absolute accuracy of the generator to frequency depends upon the accuracy to which the gyromagnetic ratios corresponding to the absorption lines of the samples 29 and 63 are known and to the accuracy of the crystal control of the fluxmeter. At present the latter factor can be controlled to a greater degree of accuracy than the other factors, since crystal oscillators can, with suitable precautions, be maintained stable to within one part in $10^6$ or $10^7$ or even better. The gyromagnetic ratios of the various lines which might be used in carrying out the present invention are not, in general, known with the same degree of accuracy, although those which have been here specified, i. e., the electron absorption line of such materials as the hydrazyl and the proton absorption line of the hydrogen atom, in oil, water, or other hydrogen-rich compound, wherein its gyromagnetic rate is known, may give the invention an accuracy of approximately one part in $10^6$ where these materials are used. It should be obvious that the narrower and more pronounced the lines used, the greater will be the accuracy of the apparatus. Lines attributable to heavier nuclei are in general weaker and less clearly defined, although, if used, they will give higher multiplication factors. The nuclear gyromagnetic ratios of duterium and lithium, for example, will give multiplication factors, respectively, of approximately two and three times that of the proton absorption line. Furthermore, the electron gyromagnetic ratio is affected slightly by the orbital motions of electrons in the various paramagnetic compounds used, and the electron gyromagnetic ratios of the various available components therefore differ slightly. Lists of a large number of absorption lines and their corresponding gyromagnetic ratios are available in the literature and it is easy to select from these materials and lines suitable for specific applications. With regard to the electron absorption line it is even possible to make the sample purely electronic, by injecting a stream of electrons into a vacuum tube in the field, in which case the gyromagnetic constant is 2 instead of a slightly larger number.

It is not necessary, however, that the nuclear and electron gyromagnetic ratios themselves be known exactly for the materials employed. It is the ratio of the gyromagnetic ratios which is important. This can be measured at low frequency and the crystal oscillator ground to the proper value for its intended application.

In addition to the substitutions of materials to obtain absorption lines of various frequency ratios and thus vary the multiplication ratio of the apparatus, numerous substitutions of elements are possible within the scope of the present invention. Thus the use of sawtooth waves for scanning the magnetic field to which the gyromagnetic samples are exposed is not a necessary feature, although it leads to the simplest instrumentation and greatest accuracy of the device. With any form of scanning wave a pulse will be generated each time the value of the magnetic field passes through a resonance point. If a sawtooth wave is used the pulse generated on the flyback is so short and carries so little energy that its effect is negligible. If a symmetrical waveform is used, such as a sine wave, the pulse which leads in the positive-going swing will lag on the negative-going swing and therefore a simple discriminator such as that shown in the figure will not develop a corrective error-voltage. Accordingly, if a sine wave or other symmetrical wave is used for scanning it becomes necessary to provide more complex circuitry; e. g., means operating synchronously with the scanning voltage for switching the modulating pulses into separate discriminators and combining their outputs additively in the proper direction to supply the requisite error-voltage. Ordinarily this merely means unnecessary complication of apparatus.

The frequency of the scanning generator 35 is not particularly important. Ordinarily it will lie in the lower audio frequencies, say in the neighborhood of 250–300 cycles per second. The lower the frequency the greater will be the energy represented by each pulse, but the higher the frequency the greater the number of pulses, and hence the total available energy for supplying the error voltage remains approximately the same. The higher the frequency the more responsive the device is to short time variations of frequencies of the generator, but the frequencies suggested offer sufficiently short delay for substantially all applications.

The constant component of the magnetic field between the pole pieces $27_n$ and $27_s$ may be supplied by a permanent magnet equally as well as by an electromagnet if the desired frequency of the generator is never varied. Using a permanent magnet some minor variations in field intensity are possible by adding a direct component to the saw-tooth scanning current. If an electromagnet is used the same winding, or part of the same winding, can be used to carry the varying component as well as the constant field component.

It has already been mentioned that it is not necessary that the constant component be exactly that required to establish the nuclear absorption line of the sample 53 and the electron absorption line of the sample 49 at their desired values, as long as the field swings on both sides of the correct value; if an electromagnet is used the fluxmeter 51 can be used for its ordinary purpose to set the constant field at its exact theoretical value, and the same can be done if a bias current is superposed upon the scanning field of a permanent magnet, but this is not necessary as long as the field intensity is approximately correct; i. e., well within the range through which the resultant field is swept.

Other forms of wave shaper than the simple differentiating circuit 63—65 can be employed, and numerous other forms of phase sensitive detectors or phase discriminators are known in the art. The use of the Bloch type of fluxmeter instead of the Pound type has already been referred to.

It has also been mentioned that the device is applicable to other types of generator than the klystron type illustrated. Substantially all such generators as are adapted to operate in the microwave range are voltage-sensitive to more or less degree so far as their frequency of operation is concerned. Where this is the case it is only necessary to select the electrode with respect to which the change of voltage has a maximum effect upon the frequency of operation and that imposes the smallest load on the phase discriminator. In the klystron illustrated this is the reflector electrode which, in theory at least, carries no current and yet where a change in potential with respect to the cathode has the maximum effect upon the transit time of the electrons and therefore the greatest effect upon the frequency of operation.

Numerous other variations in the apparatus will doubtless occur to those skilled in the art. The precise form of apparatus shown is therefore not intended to be limiting upon the scope of the invention, all intended limitations being specifically set forth in the appended claims.

What is claimed is:

1. Means for stabilizing the frequency of a generator of electrical oscillations in the microwave range comprising a resonator adapted to be loosely coupled to said generator, a first sample of paramagnetic material of known gyromagnetic ratio coupled to said resonator, means for establishing a magnetic field through said sample, said magnetic field varying cyclically in strength through a relatively narrow range as compared to its average value, the range of variation extending both above and below a value whereat said sample has an absorption line centered at the desired frequency of the generator to be stabilized so as to produce by absorption pulses of downward modulation in the oscillations within said resonator, a second sample of paramagnetic material so positioned as to lie within said magnetic field and having a nuclear gyromagnetic ratio such as to produce therein an absorption line at a known fraction of the frequency of that of said first sample of paramagnetic material, fluxmeter means coupled to said second sample of paramagnetic material and adapted to produce a pulse of modulation of oscillations of said known fraction of the desired frequency of said generator as said magnetic field passes through the value corresponding thereto, means for detecting the pulses developed by said first sample to produce unidirectional pulses, means for detecting the pulses developed by said second sample also to produce unidirectional pulses, means for comparing the relative time sequence of the detected pulses in each cycle of variation of said magnetic field and developing therefrom a voltage depending in polarity upon the order of succession of the pulses within each cycle and in magnitude upon the interval between them, and means for applying the voltage so developed to said generator in such sense as to so alter its frequency as to tend to bring said pulses into coincidence.

2. Means for stabilizing the frequency of a generator of electrical oscillations in the microwave range comprising a resonator adapted to be loosely coupled to said generator, a first sample of paramagnetic material of known gyromagnetic ratio coupled to said resonator, means for establishing through said first sample a substantially constant magnetic field of approximately the strength required to produce therein an absorption line at the desired frequency of said generator, means for superposing on said field a cyclically varying alternating magnetic field of relatively low strength as compared to said constant field, a second sample of paramagnetic material so positioned as to lie within said magnetic fields and having a nuclear gyromagnetic ratio such as to produce therein an absorption line at a known fraction of the frequency of the absorption line of said first sample, fluxmeter means coupled to said second sample and adapted to produce a pulse of modulation of oscillations of said known fraction of the desired frequency of said generator as said superposed magnetic fields pass through the value corresponding thereto, means for detecting the pulses developed from said first sample to produce a first set of unidirectional pulses, means for detecting the pulses developed by said second sample to produce a second set of unidirectional pulses, means for comparing the relative time sequence of the detected pulses in each cycle of variation of said cyclically varying magnetic field and developing therefrom a voltage depending in polarity upon the order in which the pulses of said first and second sets occur and in magnitude on the interval between them, and means for applying said voltage to said generator in such sense as to alter its frequency so as to tend to bring said pulses into coincidence.

3. Apparatus as defined in claim 2 wherein said means for superposing a cyclically varied alternating magnetic field is adapted to produce a field of sawtooth waveform.

4. Means for stabilizing the frequency of a generator of electrical oscillations in the microwave range comprising a resonator adapted to be loosely coupled to said generator, a first sample of paramagnetic material of known gyromagnetic ratio coupled to said resonator, means for establishing a magnetic field through said sample, said magnetic field varying cyclically in strength through a relatively narrow range as compared to its average value and the range of variation extending both above and below a value whereat said sample has an absorption line centered at the desired frequency of the generator to be stabilized, thereby to produce by absorption pulses of downward modulation in the oscillations within said sample, a second sample of paramagnetic material positioned to lie within said magnetic field and having a nuclear gyromagnetic ratio such as to produce therein an absorption line at a known fraction of the frequency of the absorption line of said first sample, an oscillator connected to supply said second sample as a load and stabilized to supply a constant frequency of said known fraction of the desired frequency of said generator, whereby said oscillator is modulated to produce a pulse of downward modulation when said magnetic field passes through the corresponding value, means for detecting the pulses developed by said first sample to produce a first set of unidirectional pulses, means for detecting the pulses developed by said second sample to produce a second set of unidirectional pulses, means for comparing the relative time sequence of the detected pulses in each cycle of variation of said magnetic field and developing therefrom a voltage depending in polarity upon the order of said pulses within each cycle and in magnitude on the interval between them, and means for applying said voltage to said generator in such sense as to alter its frequency so as to tend to bring said pulses into coincidence.

5. Means for stabilizing the frequency of a generator of electrical oscillations in the microwave range comprising the combination of a resonator adapted to be loosely coupled to said generator, a first sample of paramagnetic material of known gyromagnetic ratio coupled to said resonator, means for establishing through said sample a magnetic field varying cyclically in strength through a relatively narrow range as compared to its average value, the range of variation extending both above and below a value whereat said sample has an absorption line centered at the desired frequency of the generator to be stabilized, thereby to produce by absorption pulses of downward modulation in the oscillation within said resonator, a second sample of paramagnetic material positioned within said magnetic field and having a nuclear gyromagnetic ratio such as to produce therein an absorption line at a known fraction of the frequency of the absorption line of said first sample, fluxmeter means coupled to said second sample and adapted to produce a pulse of modulation of oscillations of said known fraction of the desired frequency of said generator as said magnetic field passes through the value corresponding thereto, means for detecting the pulses developed by said first sample to produce a first set of unidirectional pulses, means for detecting the pulses developed by said second sample to produce a second set of unidirectional pulses, means for differentiating the pulses of one of said sets to produce bidirectional pulses, a phase-sensitive detector connected to compare the pulses of the other of said sets of unidirectional pulses with said bidirectional pulses to develop a voltage dependent in sign on the frequency thereof and in magnitude upon the interval between them, and means for applying said voltage to said generator in such sense as to bring said sets of unidirectional pulses into substantial coincidence.

No references cited.